United States Patent
De Laforcade

(10) Patent No.: US 7,481,227 B2
(45) Date of Patent: Jan. 27, 2009

(54) APPLICATOR DEVICE, MOLD, MOLDING PROCESS FOR THE DEVICE, AND KIT INCLUDING THE DEVICE

(75) Inventor: Vincent De Laforcade, Rambouillet (FR)

(73) Assignee: L'Oreal S.A., Paris (FR)

( * ) Notice: Subject to any disclaimer, the term of this patent is extended or adjusted under 35 U.S.C. 154(b) by 499 days.

(21) Appl. No.: 10/893,294

(22) Filed: Jul. 19, 2004

(65) Prior Publication Data

US 2005/0046087 A1    Mar. 3, 2005

Related U.S. Application Data

(60) Provisional application No. 60/499,356, filed on Sep. 3, 2003.

(30) Foreign Application Priority Data

Jul. 18, 2003    (FR) ................... 03 08802

(51) Int. Cl.
    *A45D 40/26* (2006.01)
(52) U.S. Cl. .................................. 132/218
(58) Field of Classification Search ............. 132/218, 132/160, 148, 219, 139, 140
    See application file for complete search history.

(56) References Cited

U.S. PATENT DOCUMENTS

| 2,205,200 | A | * | 6/1940 | Huppert ............. 132/161 |
| 2,830,600 | A | * | 4/1958 | Churchillo ............. 132/213.1 |
| 2,859,478 | A | * | 11/1958 | Glasson ............. 425/408 |
| 3,750,680 | A | * | 8/1973 | Miller ............. 132/119.1 |
| 4,422,986 | A | | 12/1983 | Cole |
| 4,461,312 | A | | 7/1984 | Gueret |
| 4,504,998 | A | | 3/1985 | Price et al. |
| 4,860,775 | A | | 8/1989 | Reeves et al. |
| 5,152,306 | A | * | 10/1992 | Stephan ............. 132/139 |
| 6,575,174 | B2 | * | 6/2003 | Lee ............. 132/160 |
| 2001/0035191 | A1 | | 11/2001 | Lee |

FOREIGN PATENT DOCUMENTS

| DE | 941 364 | 4/1956 |
| EP | 0 463 217 | 1/1992 |
| FR | 2 505 633 | 11/1982 |
| FR | 2 744 607 | 8/1997 |

OTHER PUBLICATIONS

English language Derwent Abstract of FR 2 744 607, Aug. 14, 1997.

* cited by examiner

*Primary Examiner*—Robyn Doan
(74) *Attorney, Agent, or Firm*—Finnegan, Henderson, Farabow, Garrett & Dunner, LLP

(57) ABSTRACT

Various embodiments of a device for applying a product are discloses. The device may include a support member and at least two separate applicator members extending from the support member. The applicator members and the support member may be defined by a single piece of material. The applicator members may include a first applicator member extending substantially rectilinearly along a principal lengthwise axis, and a second applicator member comprising a base portion extending in a direction substantially parallel to the principal lengthwise axis, and a terminal portion extending along an intersecting axis that intersects with said principal lengthwise axis. Moreover, a mold for making the device and a method of making the device are disclosed.

67 Claims, 6 Drawing Sheets

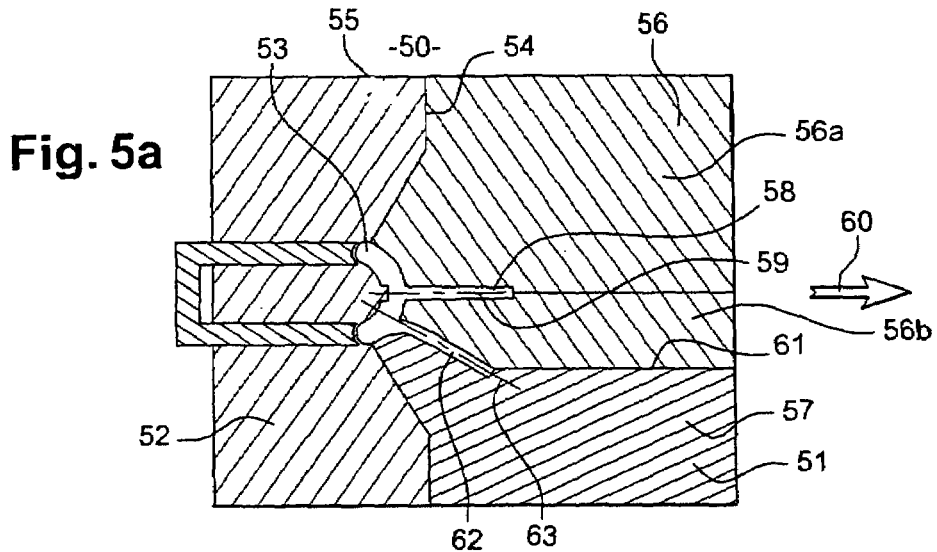
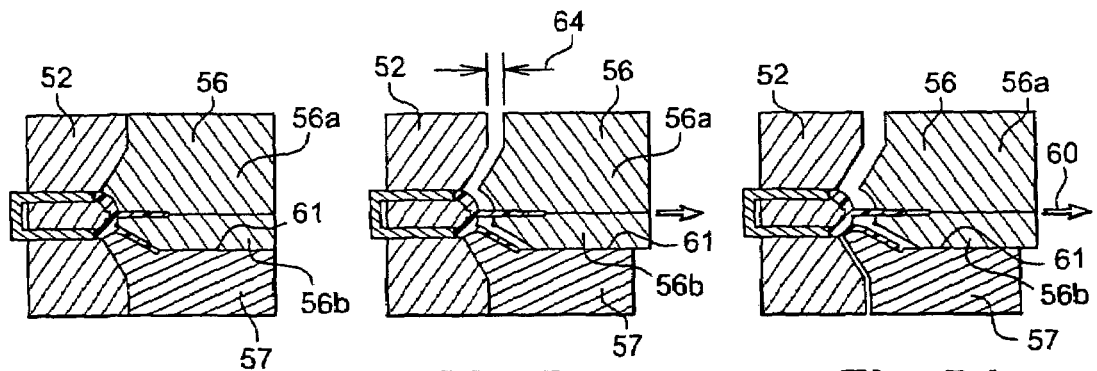
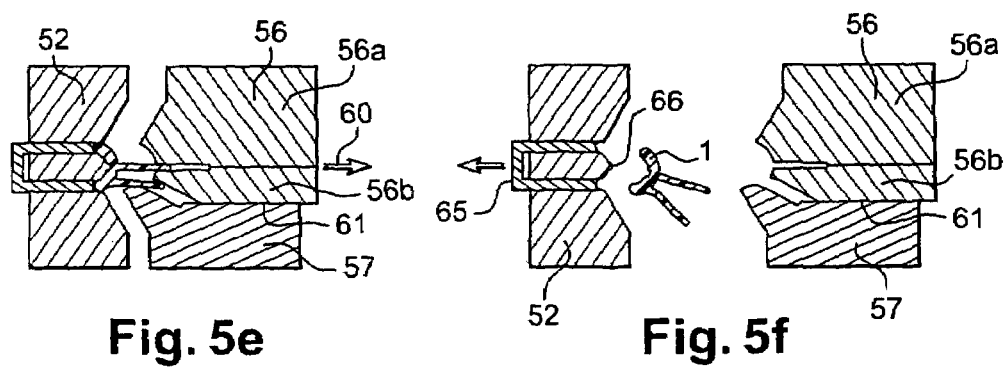

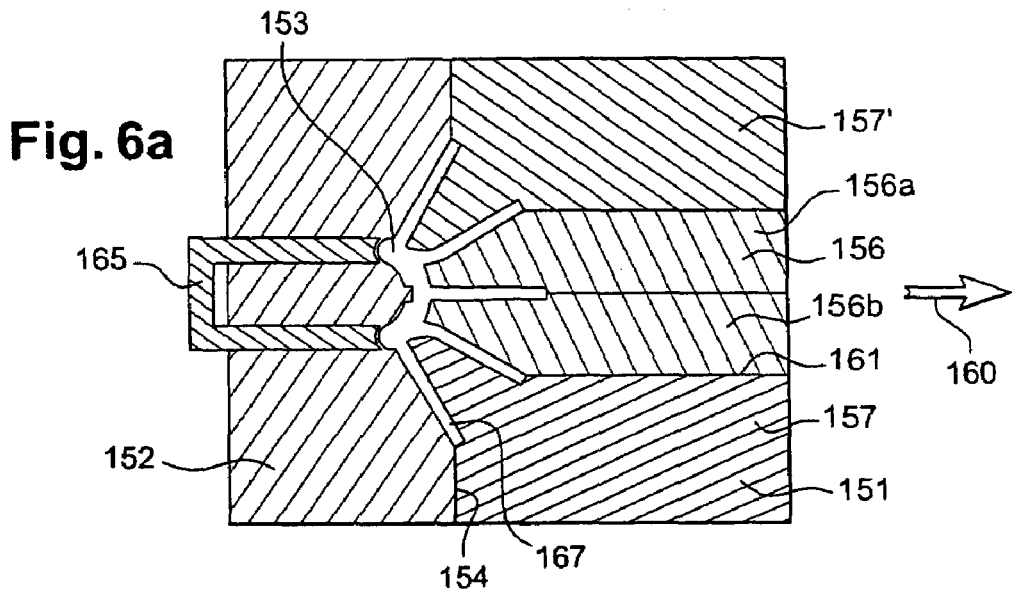
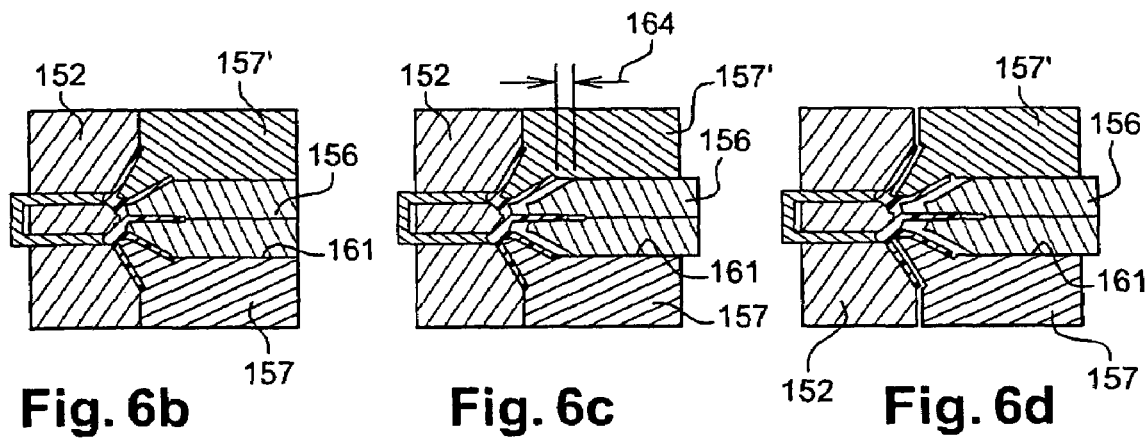
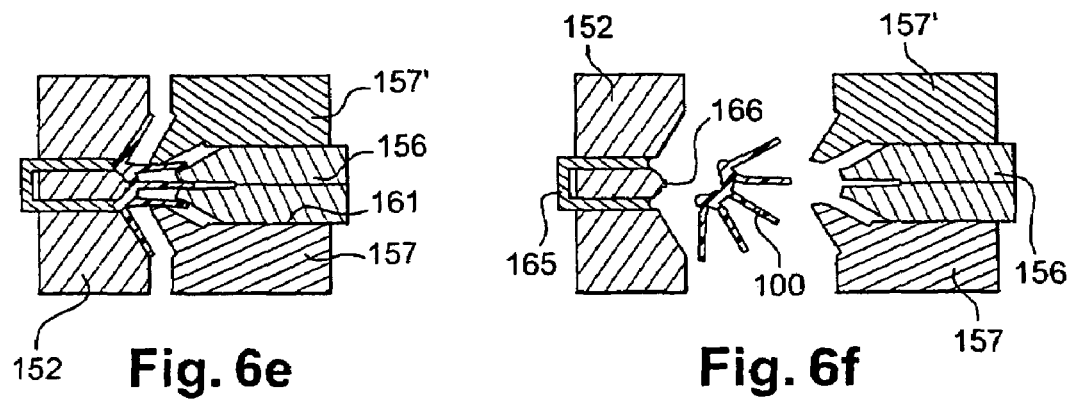

APPLICATOR DEVICE, MOLD, MOLDING PROCESS FOR THE DEVICE, AND KIT INCLUDING THE DEVICE

This application claims the benefit under 35 U.S.C. § 119 (e) of U.S. Provisional Application No. 60/499,356, filed on Sep. 3, 2003.

The present invention relates to an applicator device for applying cosmetic products (wherein the term "cosmetic products" includes care products as well as other products, such as, hair coloring, dying, or treatment products). In particular, various exemplary embodiments of the invention relate to an applicator device suitable for applying a hair care product (e.g., hair coloring products) in the form of, for example, foam, gel, paste, or cream.

One of the most sought-after hairstyling effects is to create particular locks of hair that are lighter or darker than the rest of the hair, so as to impart a highly natural effect to the overall hairstyle. These effects may be obtained by using coloring products in the form of, for example, gel, paste, foam, or cream, which may be placed on a brush and then applied to the hair.

In general, mascara brushes are being used to apply such coloring products to locks of hair. These brushes are often provided with a coloring product in a coloring kit to facilitate application of the product. Such mascara brushes generally incorporate nylon bristles held in a metal twist that is in turn force-fitted into a plastic handle. These types of brushes often include at least three separate elements of dissimilar materials and shapes, thereby requiring at least two steps to assemble those elements and rendering the manufacturing process to be costly and complicated.

The cost of mascara brushes may be further increased by the fact that the material used to make the metal twist must be compatible with various coloring products, many of which contain substances that are highly reactive to various metals. Such a material may be relatively expensive. For example, stainless steel used to make the metal twist to avoid any oxidation-reduction reactions on the twist (that are believed to be responsible for contamination of the products being applied) is more expensive than standard steel.

Mascara applicators that are injection molded of a thermoplastic material are known in the art. For example, U.S. Pat. No. 4,422,986 discloses a mascara brush obtained by injection molding, wherein the bristles are oriented perpendicularly or obliquely in relation to a brush support member. In a particular embodiment, the support member has a cylindrical outer surface, and the bristles extend radially from that outer surface.

As a method of making such a brush, U.S. Pat. No. 4,422,986 describes an injection molding process in which each bristle is obtained by injecting a molding material into a cavity formed between two separate mold pieces. Thus, in order to remove each of the bristles from the mold, the respective mold pieces are moved in the direction of a displacement axis. In the case where the same mould piece is used to form two bristles by means of two separate surfaces, the mould piece is moved along a median axis between the respective axes of the two bristles.

For a brush incorporating several bristles with each bristle extending along an axis that intersects with those of the other bristles, it may be desired, as described in FR-A-2,505,633, to move the mold pieces along different displacement directions. For example, the mold pieces may be displaced radially in relation to each other. On an industrial scale, however, it may be difficult to provide such a mold structure having a plurality of mold pieces that are movable on different displacement axes.

While mold pieces can be arranged to be displaced simultaneously on the same axis, as disclosed in U.S. Pat. No. 4,422,986, it may be desired to clean the mold on a fairly frequent basis, because numerous bristles may be broken during removal of the molded bristles and remain trapped in the mold. In fact, the bristles extending along an axis that is not parallel to the displacement axis of the mold pieces are subjected to a torsional stress exerted directly onto their base portion. Therefore, the bristles extending in an axis that forms a large angle relative to the displacement axis of the mold pieces are more likely to break during removal from the mold piece.

FR-A-2,505,633 also describes a brush equipped with injection molded bristles arranged about the entire cylindrical circumference of the brush, in which the bristles can be wider at their free ends (i.e. at the end of the bristle furthest from the base attaching the bristle to a support member).

Thus, bristles of a brush may be arranged radially, as described in U.S. Pat. No. 4,422,986 or extended parallel to each other and a displacement axis of the mold pieces, as described in U.S. Pat. No. 4,860,775.

Therefore, there may exist a need for a device for applying a product, that may be relatively simple and/or easy to make, so as to reduce the manufacturing cost.

There may also exist a need for bristles extending radially in relation to each other.

There may also exist a need for a mold for making an application device that may provide a relatively cheap and/or reliable molding process.

Although the present invention may obviate one or more of the above-mentioned needs, it should be understood that some aspects of the invention may not necessarily obviate all of those need.

In the following description, certain aspects and embodiments will become evident. It should be understood that the invention, in its broadest sense, could be practiced without having one or more features of these aspects and embodiments. It should be understood that these aspects and embodiments are merely exemplary.

One aspect of the invention may relate to a device for applying a product. The device may comprise a support member, at least two separate applicator members extending from the support member. The applicator members and the support member may be defined by a single piece of material. The applicator members may also comprise a first applicator member extending substantially rectilinearly along a principal lengthwise axis, and a second applicator member comprising a base portion extending in a direction substantially parallel to the principal lengthwise axis, and a terminal portion extending along an intersecting axis that intersects with said principal lengthwise axis.

As used herein, the term "applicator member" is intended to encompass any type of applicator element (e.g., a bristle, a tooth, etc.) that is configured to contact a body portion to apply a product and that may be capable of being formed by injection molding.

In another aspect, at least one of the first and second applicator members may comprise a bristle. In some examples, the piece of material may be a piece of injection molded material.

In still another aspect, the single piece of material may comprise a thermoplastic material. The thermoplastic material may comprise polypropylene or polyethylene. Since some exemplary configurations of the device may permit utilization of industrial molding techniques, certain embodiments of the device may be made with a very low production cost.

In still yet another aspect of the invention, the base portion of the second applicator member may have a length less than one third (⅓) of the total length of the second applicator member, where the total length may correspond to the combined length of the base portion and the terminal portion along their respective lengthwise axes. In a particular embodiment, the base portion of the second applicator member may have a length approximately 1/10$^{th}$ of the total length of the second applicator member. For example, the base portion may have a length less than 3 millimeters (mm), e.g., about 0.5 mm, or a length ranging from about 2% to about 20%, e.g., from about 5% to about 10%, of the total length of the second applicator member.

In an aspect, the first applicator member may have a length ranging from about 3 mm to about 25 mm along the principal lengthwise axis. In a particular embodiment, the length may be approximately 5 mm.

According to still another aspect, the intersecting axis may form an acute angle with the principal lengthwise axis. For example, the intersecting axis may form an angle of approximately 30° with the principal lengthwise axis. As a variant, the intersecting axis may form an angle ranging from about 20° to about 90°. As the acute angle increases, the length of the base portion relative to the total length of the applicator member may also increase.

According to another aspect of the invention, the device may further comprise a third applicator member extending along an oblique axis relative to the principal lengthwise axis. The oblique axis may form an angle of approximately 60° with the principal lengthwise axis. In the case where the second bristle extends between the first applicator member and the third applicator member, the second applicator member may form an acute angle of approximately 30° with the principal lengthwise axis, while the third applicator member may form an acute angle of approximately 60° with the principal lengthwise axis.

The third applicator member may include a base portion extending along an axis parallel to the principal lengthwise axis, if the third applicator member is not formed at a joint plane between two molding blocks used for injection molding of the device. In this particular embodiment, the third applicator member may be positioned adjacent to the first applicator member as the second applicator member.

If, on the other hand, the third applicator member is formed at a joint plane between the two molding blocks, the third applicator member may have any structure insofar as the two molding blocks can define a particular, desired shape at the joint plane. For example, the joint plane may be configured to delineate an internal space having a wavy profile between the two molding blocks so as to make the third applicator member having a wavy profile.

In still another aspect, at least one of the first, second, and third applicator members may have a generally tapered shape. For example, at least one of the first, second, and third applicator members may have a conical or frusto-conical shape with its cross-sectional area decreasing from a base (e.g., a point at which the applicator member attaches to the support member) to the free end. In an exemplary embodiment, the applicator member may have a conical shape with a substantially circular cross-sectional area. The diameter of the cross-sectional area may vary from about 0.6 mm to about 0.4 mm.

In an aspect, an outer surface of the second applicator member may form an arc between the base portion and the terminal portion. The arc may have a maximum angle at a location closest to the first applicator member.

Another aspect of the invention may further comprise at least two rows of applicator members. The applicator members in a first row may be defined in a plane containing the principal lengthwise axis, and the applicator members in a second row may be defined at least partially in a plane containing the intersecting axis. In still another aspect, the support member may have an elongated shape along a longitudinal axis, and at least one of the two rows of applicator members may extend substantially parallel to the longitudinal axis. For example, the two planes of the first and second rows may be defined in such a manner that the planes may intersect on a line passing through the support member, and this line may extend substantially parallel to the longitudinal axis of the support member.

In still yet another aspect of the invention, the applicator members in the first row may be offset, for example in a staggered arrangement, relative to the applicator members in a second row, thereby permitting, for example, an enhanced brushing effect. The offset may be on the order of several tenths of a millimeter, for example, so that the applicator members in one row may not be disposed in the middle of the space defined between two applicator members in an adjacent row.

In another aspect, the device may define a plane of symmetry containing the principal lengthwise axis of the first applicator member. In an embodiment, the support member may have a generally kidney-shaped cross-section.

In still another aspect, the support member may comprise a first surface and a second surface substantially opposite the first surface, and the applicator members may extend only from the first surface of the support member. This particular configuration may be arranged without having the applicator members molded around the entire outer circumference of the support member inasmuch as the user may utilize only a limited segment of an applicator device (e.g., approximately 120°), even when the applicator members are disposed over its entire circumference. This arrangement may also allow more precise application of a product.

In another aspect, the second surface may comprise a groove at least partially along the length of the support member. The groove may comprise a wider portion and a narrower portion, and a distance between a bottom of the groove and the narrower portion may be greater than a distance between the bottom of the groove and the wider portion. The wider portion may comprise a substantially flat surface, and the substantially flat surface may be substantially perpendicular to the principal lengthwise axis.

According to another aspect, the device may comprise a handle extending from the support member to form a brush. The handle may comprise an annular collar or flange around the handle to facilitate manipulation of the handle, including rotational movement about the axis of the handle.

In still another aspect, the handle may comprise a blade at, for example, a distal end opposite the end from which the applicator members may extend. This blade may be substantially flat in shape, for example, on an axis orthogonal to the principal lengthwise axis of the first applicator member. This blade may be used to select locks of hair not coated with the product.

Another aspect of the invention may relate to an applicator kit for applying a product. The kit may comprise a receptacle configured to contain a product to be applied, and a device used to apply the product contained in the receptacle to a body. The kit may further comprise a cosmetic product (e.g., a hair coloring product) contained in the receptacle. The kit may comprise at least two products packaged separately. For example, the kit may comprise a coloring or color-removing powder and an oxidizing liquid. These two products may require mixing before application, and the mixing may be accomplished in a bowl, for example, which may also be provided with the applicator kit. In various exemplary embodiments, the device may be used for the mixing.

In another aspect, the two products may be packaged in a mixing device (e.g., bowl, shaker, mixer, etc.) suitable for extemporaneous mixing of the various constituents (generally a colorant and an oxidizing agent), wherein mixing may be performed by hand, or in pressurized containers.

Another aspect of the invention may relate to a method of applying a cosmetic product. The method may comprise providing the applicator kit and applying the cosmetic product contained in the receptacle using the applicator. In still another aspect, the method may comprise providing an applicator device and applying the product using the device. The product may be a hair product. The hair product may comprise a hair coloring product. In the method, the product may be applied to hair on the scalp.

An aspect of the invention may relate to a mold for making an applicator device by injection molding. The mold may comprise a first block and a second block configured to cooperate with the first block to define an internal volume corresponding to the device. At least one of the first and second blocks may be movable relative to the other of the first and second blocks along a displacement axis to facilitate release of the device molded in the internal volume. The displacement axis may be parallel to the principal lengthwise axis of the first applicator member.

In another aspect, the first block may comprise two mold pieces defining a joint plane therebetween, and the joint plane may pass through a portion of the internal volume defining at least one of the first and second applicator members. In still another aspect, the two mold pieces may be independently movable relative to one another along the displacement axis. The joint plane may allow the expulsion of any air bubbles responsible for impeding optimal filling of the internal volume. In some examples, the risks of defective molding may thus be reduced.

In still yet another aspect of the invention, the first and second blocks may define a joint plane therebetween. The joint plane may pass through a portion of the internal volume defining at least one of the first and second applicator members. Alternatively or additionally, the joint plane may pass through a portion of the internal volume defining the support member.

In an aspect, one of the first and second blocks may delineate a portion of the internal volume that may define at least one of the first and second applicator members.

Another aspect of the invention may comprise an ejector member associated with at least one of the two blocks. The ejector member may be configured to eject the molded device from the internal volume. In still another aspect, the second block may be fixed along the displacement axis.

In another aspect, the second block may comprise a backdraft configured to hold the support member of the molded device when the first block is displaced along the displacement axis.

In still another aspect, the mold may define a plane of symmetry passing through a portion of the internal volume defining the first applicator member.

To facilitate injection of the material intended to assume the shape and occupy substantially the entire internal volume defined by the mold, according to still yet another aspect, the device may comprise an injection point permitting injection of a molding material from outside of the mold to the internal volume.

In various aspects, the first block may comprise a third mold piece defining a second joint plane with at least one of the first and second mold pieces. The third mold piece may be independently movable relative to the first and second mold pieces.

In another aspect, the second joint plane may pass through a portion of the internal volume that may define at least one of the first and second applicator members. Alternatively or additionally, the second joint plane may pass through a portion of the internal volume that may define a third applicator member. The mold may be arranged so that the outer surface of the second applicator member may form an arc between the base portion and the terminal portion, where the arc may have a maximum angle at a location closest to the first applicator member. For example, insofar as the terminal portion extends along an axis intersecting with the axis along which the base portion extends in the same plane, they may define, on a first side, a first arc having an angular opening greater than 180° and, on a second side, a second arc having an angular opening counterpart to the first arc which may be less than 180°. In this particular embodiment, the sides of the base and terminal portions forming the first arc may be opposite the first applicator member.

In accordance with another aspect of the invention, there may be a method of making an application device by injection molding. The method may comprise providing the mold, assembling the first and second blocks to define the internal volume, injecting a molding material into the internal volume, solidifying the molding material injected into the internal volume, displacing the first block away from the second block along the displacement axis, and ejecting the molded device from the internal volume.

In an aspect, displacing the first block may comprise displacing a first mold piece of the first block away from the second block along the displacement axis, where the first mold piece may delineate at least a portion of the internal volume that may define the second applicator member. In another aspect, displacing the first mold piece may clear at least one side of the second applicator member over a length above the base portion.

Still another aspect of the invention may further comprise displacing a second mold piece of the first block along the displacement axis to release the applicator members from the first block. The second mold piece may cooperate with the first mold piece to delineate the portion of the internal volume that may define the second applicator member.

In various aspects, displacing the second mold piece may comprise displacing the second mold piece together with the first mold piece with an offset there between.

In accordance with another aspect, a device for applying a product may comprise a support member, a plurality of first applicator members arranged in a first row and projecting substantially rectilinearly from a surface of the support member, and a plurality of second applicator members arranged in a second row adjacent the first row. At least one of the second applicator members may comprise a first portion adjacent to the support member and a second portion adjacent to the first portion. The first portion may extend parallel to the first applicator members, and the second portion may extend in a direction non-parallel to the first portion and away from the first row.

In another aspect, the support member may have an elongated shape along an axis, and at least one of the first and second rows may extend parallel to said axis. The first row may extend in a plane that is coplanar with a median plane of the support member containing said axis.

According to still another aspect, the support member may have a convex shape with respect to said axis. The first applicator members and the second portions of the second applicator members may extend from the support member in a direction substantially radial to the support member.

In still yet another aspect, the support member may comprise a first surface and a second surface opposite the first surface, and the applicator members may extend only from the first surface. The second surface may comprise a groove at least partially along a length of the support member. The groove may comprise a wider portion and a narrower portion. The distance between a bottom of the groove and the narrower portion may be greater than a distance between the bottom of the groove and the wider portion. The wider portion may comprise a substantially flat surface, where the flat surface may be substantially perpendicular to an axis of the first applicator members.

In an aspect, the first portion may have a length ranging from about 2% to about 20% of the total length of said at least one of the second applicator members. For example, the first portion may have a length ranging from about 5% to about 10% of the total length of said at least one of the second applicator members.

In another aspect, the second applicator members may be offset axially with respect to the first applicator members.

Still another aspect of the invention may comprise a plurality of third applicator members arranged in a third row adjacent the first row on a side opposite the second row. At least one of the third applicator members may comprise a first portion extending from the support member in a direction parallel to the first applicator members and a second portion extending from the first portion in a direction non-parallel to the first portion and away from the first row. In a particular embodiment, the support member may have an elongated shape along an axis, and at least one of the first, second, and third rows may extend parallel to said axis.

In yet still another aspect, the second and third rows are arranged symmetrically with respect to the first row.

According to an aspect of the invention, the support member may have a convex shape with respect to said axis, and the first applicator members and the second portions of the second and third applicator members may extend from the support member in a direction substantially radial to said support member.

In another aspect, the device may comprise a plurality of fourth applicator members arranged in a fourth row adjacent the second row on a side opposite the first row, and a plurality of fifth applicator members arranged in a fifth row located adjacent the third row on a side opposite the first row. At least one of the fourth and fifth applicator members may be substantially rectilinear.

In still another aspect, the third applicator members may be offset axially relative to the first applicator members.

As used herein, the term "providing" is used in a broad sense, and refers to, but is not limited to, making available for use, enabling usage, giving, supplying, obtaining, getting a hold of, acquiring, purchasing, manufacturing, selling, distributing, possessing, making ready for use, and/or placing in a position ready for use.

Aside from the structural and procedural arrangements set forth above, the invention could include a number of other arrangements, such as those explained hereinafter. It is to be understood that both the foregoing description and the following description are exemplary.

The accompanying drawings, which are incorporated in and constitute a part of this specification, illustrate a number of non-limiting embodiments of the invention and together with the description, serve to explain the principles of the invention.

FIGS. 5a to 5f are schematic cross-sectional views of a mold used for manufacturing the applicator device of FIGS. 1 and 2, according to an exemplary embodiment of the invention, illustrating various stages of a manufacturing process.

FIGS. 6a to 6f are schematic cross-sectional views of a mold used for manufacturing the applicator device of FIGS. 3 and 4, according to another exemplary embodiment of the invention, illustrating various stages of a manufacturing process.

Reference will now be made in detail to the exemplary embodiments of the invention, examples of which are illustrated in the accompanying drawings. Wherever possible, the same reference numbers will be used throughout the drawings to refer to the same or like parts. It is to be understood that both the foregoing general description and the following detailed description are exemplary and explanatory only and are not restrictive of the invention, as claimed.

Figure 1:
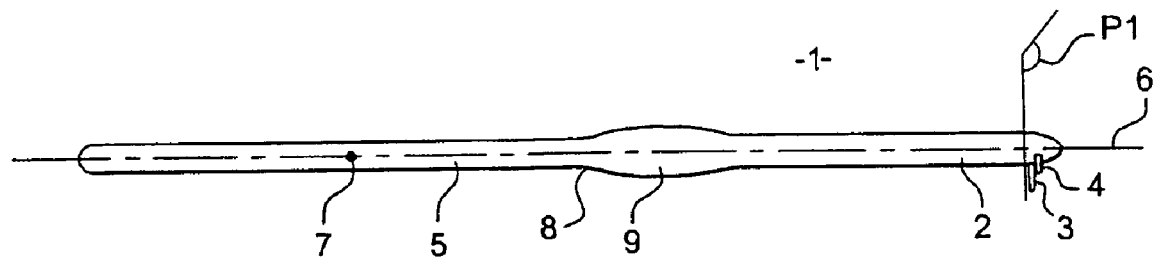
FIG. 1 is a side profile view of an applicator device, according to an exemplary embodiment of the invention.
Figure 2:
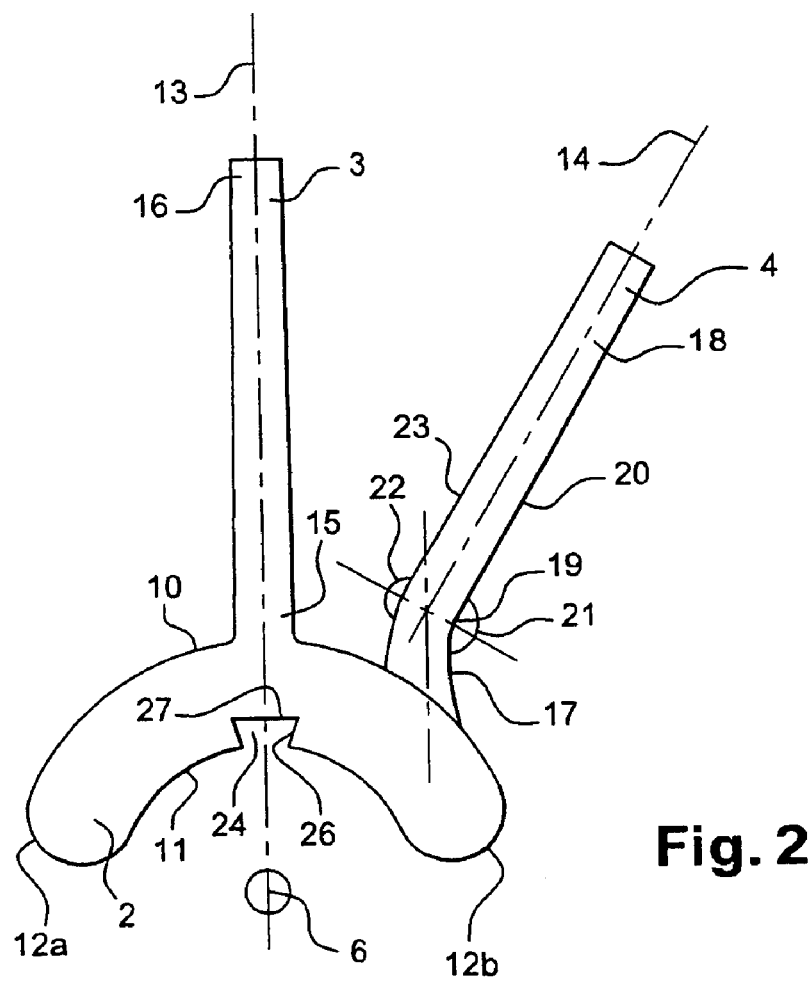
FIG. 2 is a cross-sectional view of the device of FIG. 1 at plane P1.

FIGS. 1 and 2 show a device 1 for applying a product to, for example, hair, according to an exemplary embodiment of the invention. The device 1 may include a support member 2 and at least two applicator members 3, 4 (e.g., bristles) projecting from the support member 2. The device 1 may include a handle 5 from which the support member 2 may extend. The handle 5 may extend along a grasping axis 6, as shown in FIG. 1.

The support member 2 and the applicator members 3, 4 may be defined by a single piece of material. For example, the device 1 may be made by injection molding such that the support member 2 and the applicator members 3, 4 may be integrally formed with or without the handle 5. If the handle 5 is not molded together with the support member 2, any suitable connecting mechanism (not shown) may be provided for connection between the support member 2 and the handle 5. In some examples, the support member 2 and the applicator members 3, 4 may be defined by more than one piece of material.

If the device 1 is formed by injection molding, it may be possible to observe a point 7 on a surface of the device, which may include a localized surface irregularity. The point 7 may correspond to an injection point in a mold used to make the device 1, through which a molding material (e.g., a thermoplastic material) may be injected. Although FIG. 1 shows that the point 7 is situated in the handle 5, the point 7 may be situated at any other location in the device 1, especially when the handle 5 is not integrally formed with the support member 2. Any other suitable method of material injection may be used additionally or alternatively to make the device 1.

As mentioned above, the support member 2 may be mounted at one end 8 of the handle 5. For example, in proximity to a junction zone 9, the end 8 of the handle 5 may be integrally formed with the support member 2. In an exemplary embodiment, the support member 2 may include a first surface and a second surface opposite the first surface. The applicator members 3, 4 may be arranged only on the first surface, while the second surface may be used to attach the support member 2 to the junction zone 9. In an exemplary embodiment, the support member 2 may not include the junction zone 9.

The handle 5 may have various different structures. For example, at least a portion of the handle 5 may include a cylindrical structure extending along the grasping axis 6. In various other exemplary embodiments, the handle 5 may have a regular or irregular polygonal cross-section (e.g., triangular, square, etc.) with a regular or irregular longitudinal profile. The profile of the handle 5 may also be configured to permit an ergonomic comfort to a user, so as to optimize the application. The device 1 may include a flange on an outer surface of the support member 2 and/or the handle 5, for example, near the junction zone 9 to facilitate manipulation of the device 1. By way of example only, the handle 5 may have a length of about ten centimeters along the axis 6. The applicator members 3 and 4 may be extended perpendicular to the support member 2, and/or orthogonally to the grasping axis 6.

FIG. 2 shows a cross-sectional area of the device 1 along a transverse plane P1 shown in FIG. 1. In an exemplary embodiment, the support member 2 may have a kidney-shaped cross-sectional area, as shown in FIG. 2. The support member 2 may include a first surface 10 and a second surface 11 opposite the first surface 11. The first and second surfaces 10, 11 may be joined laterally by side edges 12a, 12b. The edges 12a, 12b and the first and second surfaces 10, 11 may be substantially parallel to the grasping axis 6 of the handle 5. As shown in the figure, the first surface 10 may include a convex surface, and the second surface 11 may include a concave surface. In an alternative embodiment, at least one of the first and second surfaces 10, 11 may have a substantially flat surface. In another alternative embodiment, both the first and second surfaces 10, 11 may have a convex surface, so that the support member 2 may present a substantially ovoid transverse cross-section.

The applicator members 3, 4 may be arranged only on the first surface 10. For example, the first applicator member 3 may be set perpendicular to the first surface 10 and extend along a principal lengthwise axis 13, as shown in FIG. 2.

The second applicator member 4 may also have an intersecting axis 14 (e.g., a second principal lengthwise axis) that may intersect with the principal lengthwise axis 13. In the example shown in FIG. 2, the intersecting axis 14 may form an acute angle (e.g., about 30°) with the principal lengthwise axis 13. Alternatively, the intersecting axis 14 may form a perpendicular or obtuse angle with the principal lengthwise axis 13. Since the first surface 10 may be convex, the intersecting axis 14 may also be perpendicular to the first surface 10.

The first applicator member 3 may be rectilinear and may define, for example, a conical or frusto-conical shape with its base 15 having a larger cross-sectional area than that of its free end 16. By way of example, the first applicator member 3 may have a length of about 5 to 10 mm along the principal lengthwise axis, and the outside diameter may range from approximately 0.6 mm at the base 15 (e.g., the point of attachment to the support member 2) to approximately 0.4 mm at the free end 16. The diameter may continuously or discontinuously decrease from the base 15 to the free end 16. The principal lengthwise axis 13 may pass through both the base 15 and the free end 16.

In various exemplary embodiments, the applicator members 3, 4 may have a cylindrical shape with a constant outer diameter, a truncated or non-truncated pyramid, or any other suitable geometric shape. In some exemplary embodiments, the free end 16 of the applicator member 3 may have a rounded end, so as to prevent injury to, for example, the scalp.

The second applicator member 4 may be different from the first applicator member 3. For example, the applicator member 4 may not extend in a rectilinear manner. Instead, the applicator member 4 may include a base portion 17 extending substantially parallel to the principal lengthwise axis 13 of the first applicator member 3 and a free end 18 extending substantially along the second lengthwise axis 14 (i.e., intersecting axis), such that the free end 18 may form a bend 19 with the base portion 17. The second applicator member 4 may have a length essentially represented by the length between the bend 19 and the free end 18. In the embodiment shown in FIG. 2, the length of the base portion 17 in the direction of the principal lengthwise axis 13 may range from about 0.5 mm to about 1 mm, while the length between the bend 19 and the free end 18 in the direction of intersecting axis 14 may range from about 4 mm to about 9.5 mm.

At the level of the bend 19, the applicator member 4 may define a first side 20 forming a first angle 21 and a second side 23 forming a second angle 22 between the base portion 17 and the free end portion 18 (e.g., terminal portion), where the second angle 22 may be greater than the first angle 21.

On the cross-sectional plane P1 that is transverse to the support member 2 and therefore orthogonal to the grasping axis 6 of the handle 5, the first and second applicator members 3, 4 may not be defined in the same transverse plane, as illustrated in FIG. 2. For example, the applicator members 3, 4 may be offset from one another along the grasping axis 6.

Figure 3:
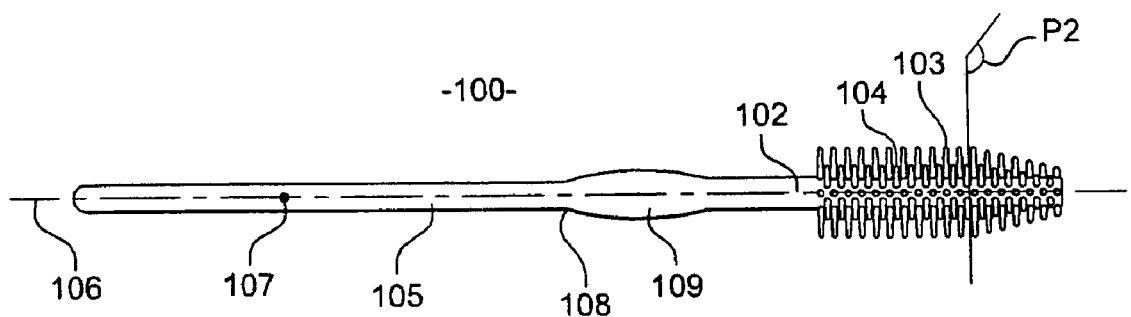
FIG. 3 is a side profile view of an applicator device, according to another exemplary embodiment of the invention.
Figure 4:
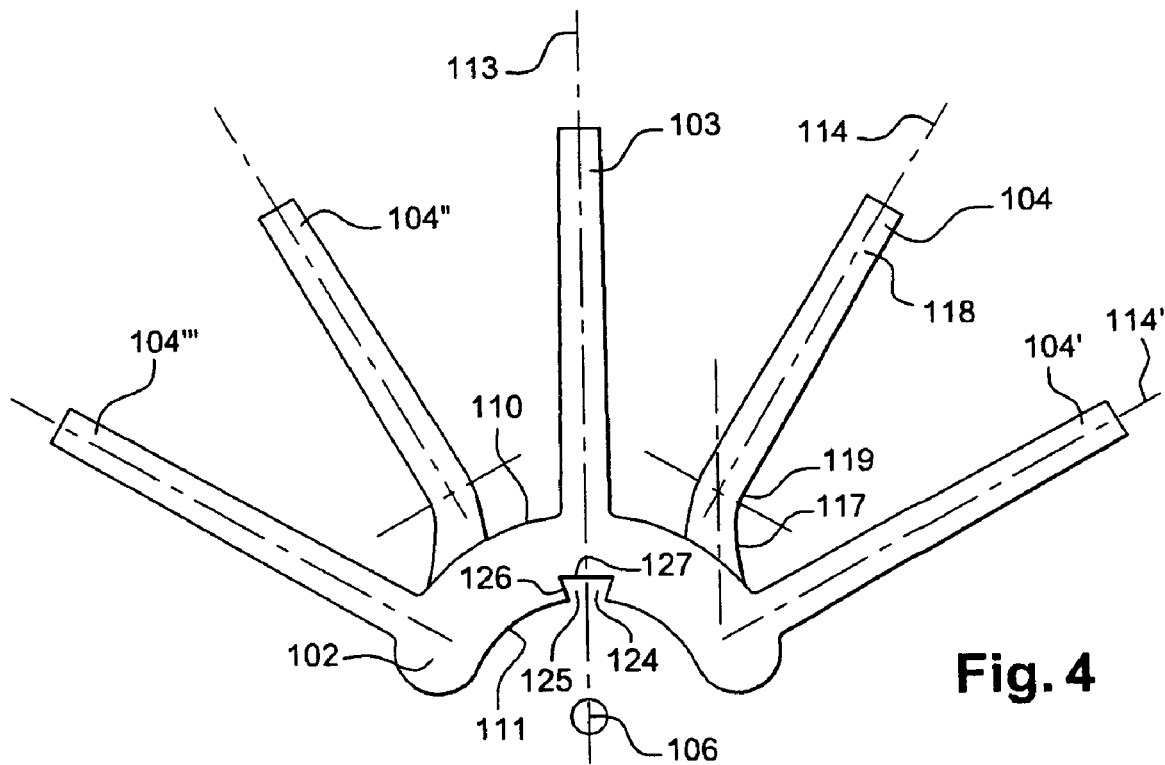
FIG. 4 is a cross-sectional view of the device of FIG. 3 at plane P2.

FIGS. 3 and 4 show a device 100 for applying a product, according to another exemplary embodiment of the invention. The device 100 may include similar features to those of the device 1 shown in FIGS. 1 and 2, and the corresponding features are similarly designated with reference numerals in the one hundreds.

The device 100 may include a support member 102 and a plurality of applicator members 103, 104, 104', 104", 104''' (e.g., bristles) extending from the support member 102. The plurality of applicator members 103, 104, 104', 104", 104''' may be arranged in at least two rows (e.g., a first row encompassing the first applicator members 103 and a second row encompassing the second applicator members 104). At least one of these rows may be aligned substantially parallel to the grasping axis 6 of the handle 5. The free ends of the applicator members 103, 104, 104', 104", 104''' may extend radially from the first surface 110 (e.g., convex surface), as shown in FIG. 4. Each row of applicator members 103, 104, 104', 104", 104''' may be defined in a plane containing the lengthwise axis 113, 114, 104' along which each of the applicator members 103, 104, 104', 104", 104''' may extend.

The applicator members 103, 104, 104', 104", 104''' in the same row may be identical. Alternatively, the length (i.e., the distance between the end of the base and the free end) of the applicator members 103, 104, 104', 104", 104''' may vary along the transverse axis 106 of the support member 102, as shown in FIG. 3.

As shown in FIG. 4, the device 100 may include a plurality of applicator members 104', 104''' arranged in at least one additional row (e.g., a third row encompassing the applicator members 104'). The applicator members 104', 104''' in the third row may extend along a lengthwise axis 114' that may form an acute angle (e.g., approximately 60°) with the principal lengthwise axis 113, such that the second row 104 may be interposed between the first row 103 and the third row 104'. The lengthwise axis 114' may form, in alternative, a perpendicular or obtuse angle with the principal lengthwise axis 113.

The third row of applicator members 104', 104''' may be rectilinear and may define a conical or frusto-conical shape, similar to the applicator members 103 of the first row. As will be described later herein, the applicator members 104' in the third row may be obtained by a joint plane (i.e., delineating a joint space for molding the applicator members) between two molding blocks configured to move apart relative to each other. In an alternative exemplary embodiment, the applicator members 104', 104''' in the third row may have any suitable shape other than the conical shape. In another exemplary embodiment, the shape of the applicator members 104', 104''' in the third row may be similar to the shape of the second applicator member 104 (e.g., both may, have a base portion angled relative to a terminal portion), especially when the applicator members 104', 104''' are not formed by the joint plane between the two molding blocks.

The device 100 may include a plane of symmetry containing the grasping axis 106 and the principal lengthwise axis 113, as shown in FIG. 4. By virtue of this symmetry, the device 100 may include at least five separate rows of applicator members 103, 104, 104', 104'', 104''' extending substantially radially from the support member 102 and/or with respect to the grasping axis 106. For example, the second row of applicator members 104 may include a symmetrical row of applicator members 104'' (e.g., a fourth row encompassing the applicator members 104''), and the third row of applicator members 104' may include a symmetrical row of applicator members 104''' (e.g., a fifth row encompassing the applicator members 104''').

Thus, the device 100 may include the applicator members 103', 104, 104', 104'', 104''' only on the first surface 110, so as to define a brush. In an exemplary embodiment, the applicator members 103', 104, 104', 104'', 104''' may cover an angular opening of approximately 120°. It should be understood that the rows of applicator members may have an angular spacing different from those of exemplary embodiments described above, such that the angular coverage by the applicator members may be more or less than the exemplary 120°.

As shown in FIG. 4, on the cross-sectional plane P2 that is transverse to the support member 102 and therefore orthogonal to the axis of the grasping axis 106, the applicator members 103, 104, 104', 104'', 104''' may not be defined in the same transverse plane. For example, the applicator members 104, 104'' in the second and fourth rows may be offset from the applicator members 103, 104', 104''' of the first, third, and fifth rows, such that the second and fourth rows may be defined in the same transverse plane parallel to the transverse plane containing the applicator members 103, 104', 104'''.

In the exemplary embodiment shown in FIGS. 3 and 4, the device 100 may include a plurality of applicator members arranged in five rows. Each of the rows may be respectively defined in a plane containing, at least partially (e.g., at least the terminal portion), one of the applicator members 103, 104, 104', 104'', 104''' and the grasping axis 106. The rows may not necessarily be rectilinear and can form curves, in which case the rows may be defined on non-planar surfaces.

The applicator members 103 in the first row may be arranged in a staggered relationship with respect to the applicator members 104 in the second row. Furthermore, the applicator members 104 in the second row may also be arranged in a staggered relationship with respect to the applicator members 104' in the third row. The identical staggered arrangement may be applied to the applicator members 104', 104'' arranged in the fourth and fifth rows with respect to the plane of symmetry.

Figure 7:
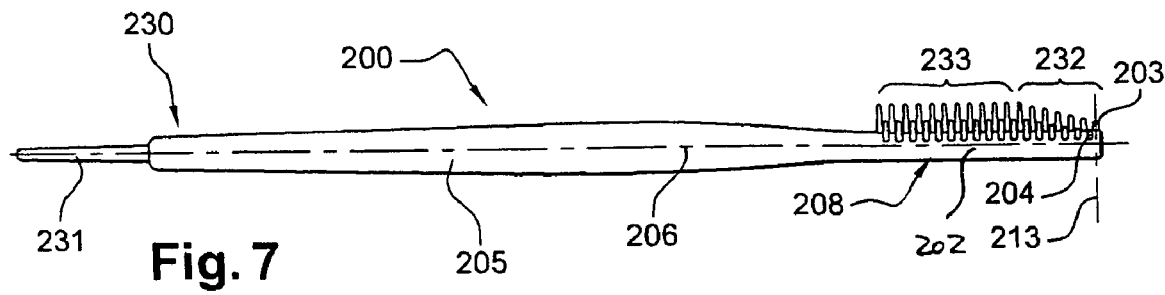
FIG. 7 is a side profile view of an applicator device, according to still another exemplary embodiment of the invention.
Figure 8:
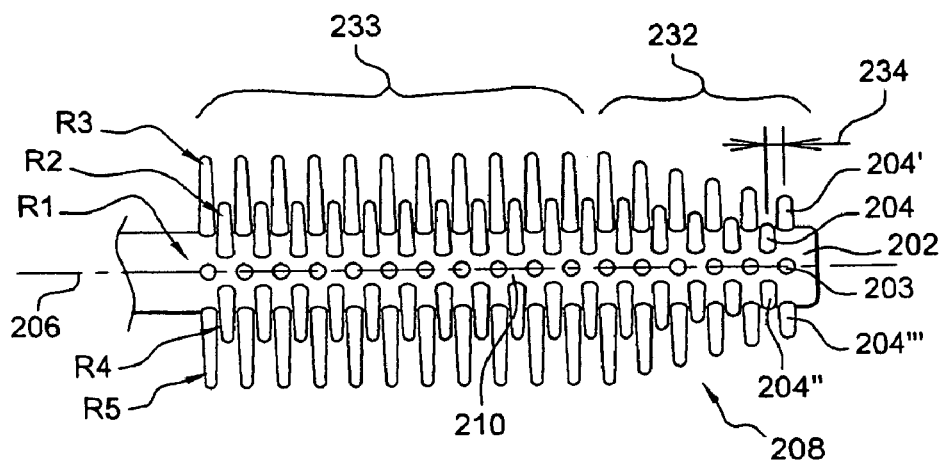
FIG. 8 is an enlarged partial view of a portion of the applicator device of FIG. 7, according to an exemplary embodiment of an applicator portion.
Figure 9:
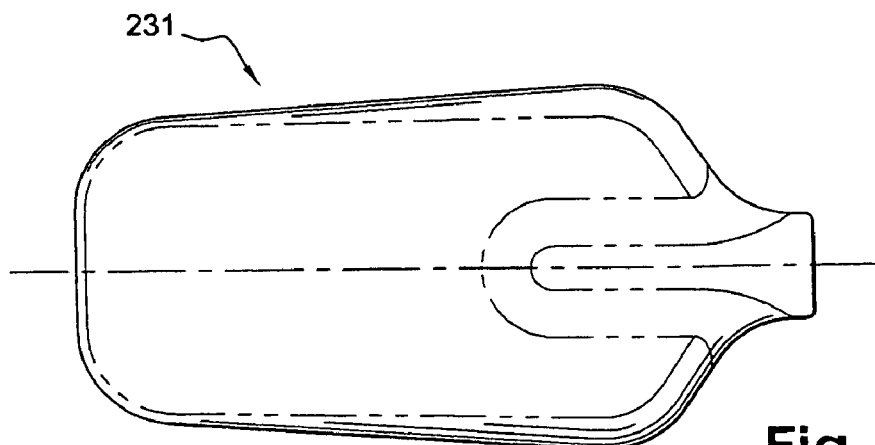
FIG. 9 is an enlarged partial view of part of the applicator device of FIG. 7, showing and exemplary blade.

FIGS. 7-9 show a device 200 for applying a product, according to still another exemplary embodiment of the invention. The device 200 may be monolithic. As shown in FIG. 7, the device 200 may include a handle 205 constituting, at a first end portion 208, a support member 202 that may carry the applicator members 203, 204. At a second end portion opposite the first end portion 208, the device 200 may include a blade 231 of a substantially flattened shape, as best shown in FIG. 9. The blade 231 may include at least one surface substantially orthogonal to the principal lengthwise axis 213 of the first applicator member 203. In an exemplary embodiment, the blade 231 may be integrally formed with the handle 205.

The purpose of this blade 231 may be, for example, to facilitate the selection of a lock of hair before applying a hair product with the applicator members 203, 204 of the device.

As shown in FIG. 8, the device 200 may include five rows R1-R5 of applicator members 203, 204, 204', 204'', 204'''. Each of the five rows R1-R5 may extend in a plane substantially parallel to the grasping axis 206 of the handle 5. In each row R1-R5, the applicator members 203, 204, 204', 204'', 204''' may have at least two different sets 232, 233 of applicator members. For example, the length of the applicator members in a first portion 232 may vary (e.g., increases) 203, 204, 204', 204'', 204''' with the applicator member at the distal-most end of the support member 202 being the shortest, while the length of the applicator members in the second portion 233 may remain substantially the same.

As shown in FIG. 8, the applicator members 203, 204' and 204''' arranged in the first, third, and fifth rows R1, R3, R5 may be aligned in the same first radial planes transverse to the longitudinal axis 206 (e.g., grasping axis) of the handle 205. Similarly, the applicator members 204, 204'' arranged in the second and fourth rows R2, R4 may be aligned in the same second radial planes transverse to the longitudinal axis 206. The first radial planes may be substantially parallel to the first radial planes. A distance 234 between these two radial planes may be in the order of several tenths of a millimeter.

The applicator members 203, 204, 204', 204'', 204''' in each row R1-R5 may define the axial planes in which each row R1, R2, R3, R4 and R5 may extend. If the applicator members are not rectilinear, at least a portion of the applicator members (e.g., the terminal portions) may define the axial planes. The axial plane of each row may also be defined by the alignment of the base portions at the surface 210 of the support member 202. In the example shown in FIG. 8, the alignment of the base portions in each row is substantially parallel to the longitudinal axis 206. In an embodiment, the distance between two adjacent applicator member in the same row may be approximately 2 mm.

Figure 10:
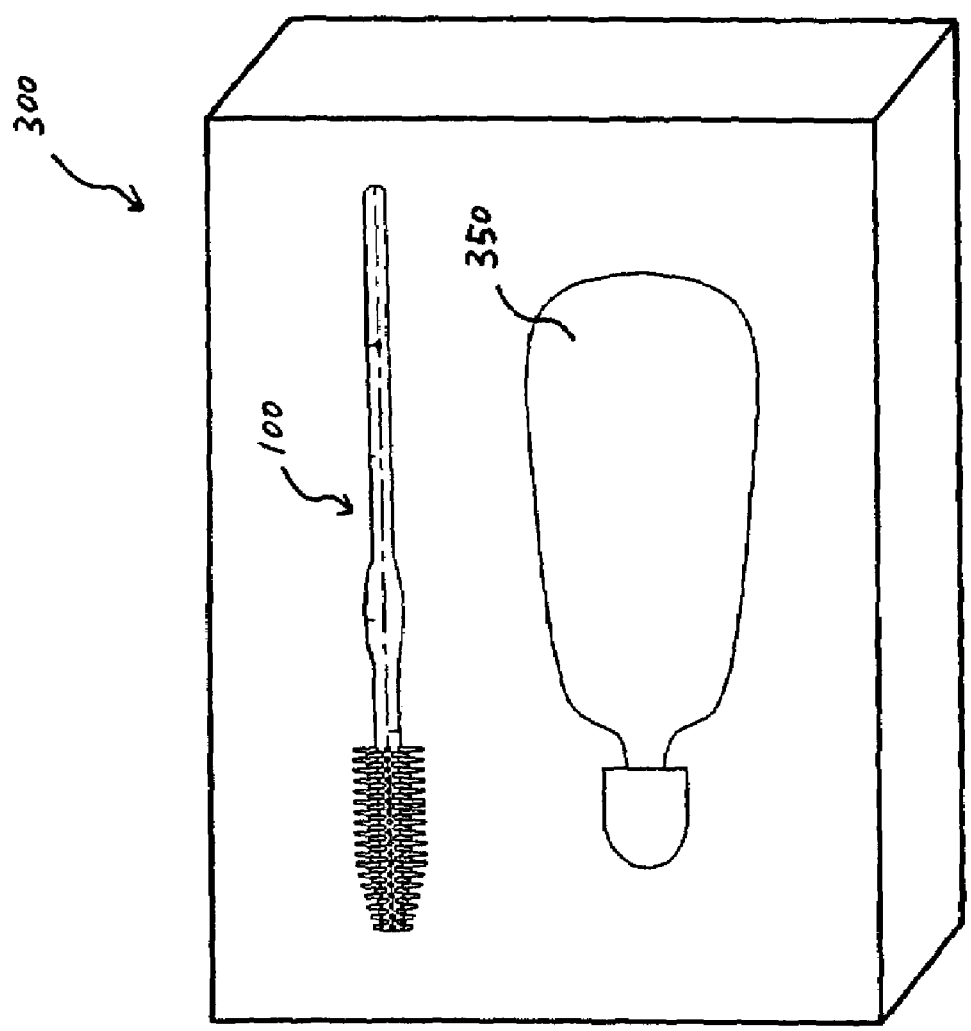
FIG. 10 is a perspective view of an applicator kit for applying a product, according to an exemplary embodiment of the invention.

FIG. 10 shows an applicator kit 300 for applying a product (e.g., hair coloring product), according to an exemplary embodiment of the invention. The kit may include a receptacle 350 containing a product to be applied and an application device 100. Although the kit 300 is illustrated with reference to a particular receptacle, it should be understood that any other receptacle known in the art (e.g., bowls, tubes, bottles, etc.) may be used alternatively or additionally. Similarly, the kit 300 may include any other suitable applicator device, such as, for example, the applicator devices shown in FIGS. 1 and 7.

The kit may include two or more products packaged separately. For example, the kit may include a separately packaged coloring or color-removing substance and an oxidizing agent. These two products may be mixed before application, and the mixing may be performed in a mixing container (that may be provided with the kit), such as, for example, a bowl or a shaker. The mixed product may then be taken up and applied to a body portion by the device according to various exemplary embodiments of the invention.

With reference to FIGS. 5a-5f, a mold and a related method of making an application device, according to an exemplary embodiment of the invention, will be described. As mentioned above, an application device may be made of a suitable material, such as, for example, a thermoplastic material by injection molding. For example, to obtain a device for applying a cosmetic product, such as that shown in FIG. 1, a molding structure 50 including a first block 51 and a second block 52 may be used. At least one of the two blocks 51, 52 may be linearly movable on a displacement axis 60, such that the two blocks 51, 52 can be moved relative to each other (e.g., moving towards each other to contact each other and moving away from each other).

When the two blocks 51, 52 are brought into a mutual contact with each other, they may define, in cooperation with each other, an internal volume 53 corresponding to the shape of the device 1 by delineating the outline of the device 1 to be molded. The two blocks 51, 52 may also define a joint plane 54 surrounding the internal volume 53.

The first block 51 may serve to mold the applicator members 3, 4. In that case, the joint plane 54 may pass through a portion of the internal volume 53 that corresponds to the support member 2 of the device 1, as best shown in FIG. 5a. The joint plane may cut through the middle of a portion of the internal volume 53 that corresponds to the rounded edges 12a, 12b.

In order to mold, for example, the device 1 of FIG. 1, the two blocks 51, 52 may be brought together into a mutual contact until a sealing tightness of the joint plane 54 is assured, as illustrated in FIG. 5a. The blocks 51, 52 may be held together in the assembled condition throughout the molding process of the device 1.

As illustrated in FIG. 5b, a thermoplastic material (e.g., polypropylene or polyethylene) may be injected into the internal volume 53 via an injection point in the mold 50. Any other suitable molding material may be used alternatively or additionally. While the injection point is not visible in the sectional views of the molding structure 50 shown in FIGS. 5a to 5f, the injection point is configured to connect an outer surface 55 of the mold 50 with the internal volume 53.

Before proceeding with the removal step, as will be illustrated with reference to FIGS. 5c-5f, the thermoplastic material injected into the internal volume 53 may be allowed to solidify. The time required to solidify the injected material may depend on, for example, the characteristics of the injected material. This time may be effectively predicted by studying the material characteristics and/or any available experimental results.

The first block 51 used to mold the applicator members 3, 4 may include two mold pieces 56, 57. The first mold piece 56 may be used to form a first part of the joint plane 54 (e.g., upper joint plane) with the second block 52, and may include at least one recess 58 extending along an axis 59 parallel to the displacement axis 60 of the first mold piece 56. As best shown in FIG. 5a, the recess 58 may define a portion of the internal volume 53 corresponding to the first applicator member 3. Therefore, the lengthwise axis 59 of the recess 58 may correspond exactly to the principal lengthwise axis 13 of the molded applicator member 3.

The first mold piece 56 may be divided into two subpieces 56a, 56b defining another joint plane therebetween. This plane may pass through the recess 58. While the two subpieces 56a, 56b may be configured to move relative to one another, they may alternatively be moved simultaneously.

The second mold piece 57 of the first block 56 may be used to form a second part of the joint plane 54 (e.g., lower joint plane) with the second block 52. The second mold piece 57 may also form a second joint plane 61 with the first mold piece 56. The second joint plane 61 may serve to define a portion of the internal volume 53 that corresponds to the second applicator member 4. For example, one of the first and second sides 20, 23 of the applicator member 4 may be formed by imparting a particular shape on the first mold piece 56 delineating the second joint plane 61, while the other of the first and second sides 20, 23 may be formed by imparting a particular shape on the second mold piece 57 delineating the joint plane 61. Thus, when the two mold pieces 56, 57 are brought together in a leak-tight manner, the second joint plane 61 may define a cavity 62, so as to facilitate subsequent molding process of the second applicator member 4.

This cavity 62 may extend along an axis 63 intersecting with the axis 59 of the first recess 58. As the displacement axis of the second mold piece 57 is parallel to the displacement axis 60 of the first block 51, the second applicator member 4 may be removed in two stages.

For example, as illustrated in FIG. 5c, the two mold pieces 56 and 57 may not be moved simultaneously. In various exemplary embodiments, the first mold piece 56 delineating the second side 23 (i.e., including the maximum angle at the bend 19 relative to the first side 20) may be moved first along the displacement axis 60. The first mold piece 56 may be moved a distance 64 relative to the second block 52, such that this distance 64 may be at least greater than the length of the base portion 17 of the second applicator member 4, while the applicator member 4 is at least partly being delineated by the second mold piece 57.

While the displacement of the first mold piece 56 is continued to remove the molded device 1 from the molding structure 50, the second mold piece 57 may be moved together with the first mold piece 56 in a direction parallel to the displacement axis 60, as shown in FIG. 5d. The distance between the first and second mold pieces 56, 57 may be less than the distance 64, such that the applicator member 4, partially free on one side 23, may start detaching from the second mold piece 57. The second applicator member 4 may be sufficiently flexible, at least at the bend 19, so as to permit movement of the second mold piece 57 along the displacement axis 60. During the movement, the second mold piece 57 may effectively dry the outer surface of the first side 20 of the applicator member 4. As the first mold piece 56 may be offset relative to the second mold piece 57, a free space may be created to allow the applicator member 4 to bend slightly.

The second mold piece 57 may be moved along the displacement axis 60, while maintaining the distance 64 from the first mold piece 56. As illustrated in FIG. 5e, the removal process of the device 1 may be further proceeded by moving the first block 51 further away from the second block 52. As the molded device 1 is removed from the mold, the second applicator member 4 may be subjected to a bending stress exerted at the bend 19. Since the bend 19 is separated from the base (e.g., at a point of attachment to the support member 2)

with a distance, the applicator member 14 may have a sufficient flexibility, thereby preventing breakage during the removal step.

Once the applicator members 3, 4 are completely removed from the two mold pieces 56, 57, the support member 2 having been held integrally with the second block 52 may be expelled therefrom by an ejector 65. The ejector 65 may be movable relative to the second block 52 in a direction parallel to the displacement axis 60. Thus, the ejector 65 may serve to fully release the molded device 1 from the mold structure 50.

While the applicator members 3, 4 are being removed from the molding pieces 56, 57, the device 1 may be held in the second block 52 by a back-draft 66 cooperating with the groove 24 of the support member 2. As describe above, the groove 24 may include walls inclined at an angle counter to the removing action. For example, the groove 24 includes an opening 25 defined perpendicular to the principal lengthwise axis 13 of the applicator member 3. The groove 24 may have a bottom surface 27 opposite the opening 25. Between the bottom surface 27 and the opening 25, the groove 24 may include a wall 26 oriented such that a cross-sectional area of the groove 24 proximate the opening 25 is smaller than a cross-sectional area proximate the bottom surface 27.

The wall 26 may also be oriented such that it may tapered from the opening 25 towards the bottom 27. For example, a cross-sectional view of the groove 24 may be trapezoidal.

Furthermore, the second block 52 may be fixed relative to the molding machine, and the injection point may be, for example, situated at the level of this fixed part.

FIGS. 6a-6f illustrate a mold and a related method of making an application device, according to another exemplary embodiment of the invention. This embodiment may be particularly suitable for making a device of the type previously described with reference to FIGS. 3 and 7. For example, to make a device 100, 200 of FIGS. 3 and 7, a mold 150 may be used, the corresponding features of which are similarly referenced with reference numerals in the one hundreds, and a detailed description of the similar features are thereby omitted.

As best shown in FIG. 6a, the mold 150 may include a first block 151 and a second block 152. The first block 151 may include a first mold piece 156, a second mold piece 157', and a third mold piece 157. The second and third mold pieces 157', 157 may be integrally formed or fixed relative to each other. For example, the first mold piece 156 may be surrounded by the second and third mold pieces 157', 157. Similar to the embodiment shown in FIGS. 5a-5f, the first and second blocks 151, 152 may define, in cooperation with each other, an internal volume 153 corresponding to the shape of the device 100, 200. In this particular embodiment, the first and second blocks 151, 152 may define a joint plane passing through a portion 167 of the internal volume 153 that defines an applicator member (e.g., a third applicator member 104').

If the device 100 to be obtained has a plane of symmetry, the mold 150 may also have a plane of symmetry. For example, the first mold piece 156 may be surrounded by the second and third mold pieces 157, 157' with a plane of symmetry passing through a mid-plane in the first mold piece 156.

The first mold piece 156 may be divided into two mold pieces 156a, 156b such that a joint plane between these two mold pieces may pass through a recess of the internal volume 135, that may be intended to mold the first applicator member 103, 203.

The removal process of the devices 100, 200 is substantially identical to those described with reference to FIGS. 5a-5f and the detailed description is thereby omitted.

It will be apparent to those skilled in the art that various modifications and variations can be made to the structure and methodology of the present invention. Thus, it should be understood that the invention is not limited to the examples discussed in the specification. Rather, the present invention is intended to cover modifications and variations.

What is claimed is:

1. A device for applying a product, comprising:
   a support member;
   at least two separate applicator members extending from the support member,
   wherein the applicator members and the support member are defined by a single piece of material, and
   wherein the applicator members comprise
   a first applicator member extending substantially rectilinearly along a principal lengthwise axis, and
   a second applicator member comprising a base portion extending in a direction substantially parallel to the principal lengthwise axis, and a terminal portion connected to the base portion and extending from the base portion rectilinearly away from the support member and along an intersecting axis that intersects with said principal lengthwise axis,
   wherein the first applicator member comprises a free end facing in a first substantially radial direction away from the support member, and the second applicator member comprises a free end facing in a second direction away from the support member, the second direction differing from the first substantially radial direction.

2. The device according to claim 1, wherein at least one of the first and second applicator members comprises a bristle.

3. The device according to claim 1, wherein the single piece of material comprises a thermoplastic material.

4. The device according to claim 3, wherein the thermoplastic material comprises polypropylene and/or polyethylene.

5. The device according to claim 1, wherein the base portion of the second applicator member has a length less than $\frac{1}{3}$ of the total length of the second applicator member.

6. The device according to claim 5, wherein the base portion of the second applicator member has a length approximately $\frac{1}{10}^{th}$ of the total length of the second applicator member.

7. The device according to claim 1, wherein the first applicator member has a length ranging from about 3 mm to about 25 mm along the principal lengthwise axis.

8. The device according to claim 1, wherein the intersecting axis forms an acute angle with the principal lengthwise axis.

9. The device according to claim 8, wherein the intersecting axis forms an angle of approximately 30° with the principal lengthwise axis.

10. The device according to claim 1, further comprising a third applicator member extending along an oblique axis relative to the principal lengthwise axis.

11. The device according to claim 10, wherein the oblique axis forms an angle of approximately 60° with the principal lengthwise axis.

12. The device according to claim 1, wherein at least one of the first and second applicator members has a generally tapered shape.

13. The device according to claim 1, wherein at least one of the first and second applicator members has a conical or frusto-conical shape with a cross-sectional area decreasing from a base to a free end.

14. The device according to claim 13, wherein the cross-sectional diameter varies from about 0.6 mm to about 0.4 mm.

15. The device according to claim 1, wherein an outer surface of the second applicator member forms an arc between the base portion and the terminal portion, the arc having a maximum angle at a location closest to the first applicator member.

16. The device according to claim 1, further comprising at least two rows of applicator members, the applicator members in a first row being defined in a plane containing the principal lengthwise axis, and the applicator members in a second row being defined at least partially in a plane containing the intersecting axis.

17. The device according to claim 16, wherein the first row and the second row are adjacent to one another, and the applicator members in the first row are offset relative to the applicator members in the second row.

18. The device according to claim 16, wherein the support member has an elongated shape along a longitudinal axis, and at least one of the two rows of applicator members extends substantially parallel to the longitudinal axis.

19. The device according to claim 1, wherein the support member has an elongated shape along an axis.

20. The device according to claim 1, wherein the device defines a plane of symmetry containing the principal lengthwise axis.

21. The device according to claim 1, wherein the support member has a generally kidney-shaped cross-section.

22. The device according to claim 1, wherein the support member comprises a first surface and a second surface substantially opposite the first surface, and the applicator members extend only from the first surface of the support member.

23. The device according to claim 22, wherein the second surface comprises a groove at least partially along the length of the support member.

24. The device according to claim 23, wherein the groove comprises a wider portion and a narrower portion, a distance between a bottom of the groove and the narrower portion being greater than a distance between the bottom of the groove and the wider portion.

25. The device according to claim 24, wherein the wider portion comprises a substantially flat surface, the substantially flat surface being substantially perpendicular to the principal lengthwise axis.

26. The device according to claim 1, further comprising a handle extending from the support member.

27. The device according to claim 26, wherein the handle comprises a flange to facilitate manipulation of the handle.

28. The device according to claim 26, wherein the handle comprises a blade.

29. An applicator kit for applying a product, comprising:
a receptacle configured to contain a product to be applied; and
the device as defined in claim 1.

30. The kit according to claim 29, further comprising a cosmetic product contained in the receptacle.

31. The kit according to claim 30, wherein the cosmetic product comprises a hair coloring product.

32. A method of applying a cosmetic product, comprising:
providing the applicator kit of claim 30; and
applying the cosmetic product contained in the receptacle using the applicator.

33. A method of applying a product, comprising:
providing the device of claim 1; and
applying a product using the device.

34. The method according to claim 33, wherein the product is a hair product.

35. The method according to claim 34, wherein the hair product comprises a hair coloring product.

36. The device according to claim 1, wherein the piece of material is a piece of injection molded material.

37. The device according to claim 1, wherein the first applicator member and the second applicator member have substantially the same length when measured from the support member.

38. The device according to claim 1, wherein all of the applicator members of the device extend from the same side of the support member.

39. The device according to claim 1, wherein the second direction is a second substantially radial direction differing from the first substantially radial direction.

40. A device for applying a product, comprising:
a support member;
a plurality of first applicator members arranged in a first row and projecting substantially rectilinearly from a surface of the support member; and
a plurality of second applicator members arranged in a second row adjacent the first row, at least one of the second applicator members comprising a first portion adjacent to the support member and a second portion adjacent to the first portion,
wherein the first portion extends parallel to the first applicator members, and the second portion extends from the first portion rectilinearly away from the support member in a direction non-parallel to the first portion and away from the first row,
wherein the first applicator members comprise free ends facing in a first substantially radial direction away from the support member, and the second applicator members comprise free ends facing in a second direction away from the support member, the second direction differing from the first substantially radial direction.

41. The device according to claim 40, wherein the support member has an elongated shape along an axis, and at least one of the first and second rows extends parallel to said axis.

42. The device according to claim 41, wherein the first row extends in a plane that is coplanar with a median plane of the support member containing said axis.

43. The device according to claim 41, wherein the support member has a convex shape with respect to said axis, and the first applicator members and the second portions of the second applicator members extend from the support member in a direction substantially radial to the support member.

44. The device according to claim 40, wherein the support member comprises a first surface and a second surface opposite the first surface, and the applicator members extend only from the first surface.

45. The device according to claim 44, wherein the second surface comprises a groove at least partially along a length of the support member.

46. The device according to claim 45, wherein the groove comprises a wider portion and a narrower portion, a distance between a bottom of the groove and the narrower portion being greater than a distance between the bottom of the groove and the wider portion.

47. The device according to claim 46, wherein the wider portion comprises a substantially flat surface, the flat surface being substantially perpendicular to an axis of the first applicator members.

48. The device according to claim 40, wherein the first portion has a length ranging from about 2% to about 20% of the total length of said at least one of the second applicator members.

49. The device according to claim 48, wherein the first portion has a length ranging from about 5% to about 10% of the total length of said at least one of the second applicator members.

50. The device according to claim 40, wherein the second applicator members are offset axially with respect to the first applicator members.

51. The device according to claim 40, further comprising a plurality of third applicator members arranged in a third row adjacent the first row on a side opposite the second row, at least one of the third applicator members comprising a first portion extending from the support member in a direction parallel to the first applicator members and a second portion extending from the first portion in a direction non-parallel to the first portion and away from the first row.

52. The device according to claim 51, wherein the support member has an elongated shape along an axis, and at least one of the first, second, and third rows extends parallel to said axis.

53. The device according to claim 51, wherein the second and third rows are arranged symmetrically with respect to the first row.

54. The device according to claim 51, wherein the support member has a convex shape with respect to said axis, and the first applicator members and the second portions of the second and third applicator members extend from the support member in a direction substantially radial to said support member.

55. The device according to claim 51, further comprising:
a plurality of fourth applicator members arranged in a fourth row adjacent the second row on a side opposite the first row; and
a plurality of fifth applicator members arranged in a fifth row located adjacent the third row on a side opposite the first row.

56. The device according to claim 55, wherein at least one of the fourth and fifth applicator members is substantially rectilinear.

57. The device according to claim 51, wherein the third applicator members are offset axially relative to the first applicator members.

58. An applicator kit for applying a product, comprising:
a receptacle configured to contain a product to be applied; and
the device as defined in claim 40.

59. The kit according to claim 58, further comprising a cosmetic product contained in the receptacle.

60. The kit according to claim 59, the cosmetic product comprises a hair coloring product.

61. A method of applying a cosmetic product, comprising:
providing the applicator kit of claim 59; and
applying the cosmetic product contained in the receptacle using the applicator.

62. A method of applying a product, comprising:
providing the device of claim 40; and
applying the product using the device.

63. The method according to claim 62, wherein the product is a hair product.

64. The method according to claim 63, wherein the hair product comprises a hair coloring product.

65. The device according to claim 40, wherein at least one of the first applicator members and the at least one of the second applicator members have substantially the same length when measured from the support member.

66. The device according to claim 40, wherein all of the first applicator members of the device and all of the second applicator members of the device extend from the same side of the support member.

67. The device according to claim 40, wherein the second direction is a second substantially radial direction differing from the first substantially radial direction.

* * * * *